US012773677B2

(12) United States Patent
Bousa et al.

(10) Patent No.: US 12,773,677 B2
(45) Date of Patent: Oct. 27, 2026

(54) METHOD OF PRODUCTION OF ADSORPTION/FILTRATION NANOMATERIAL FOR HIGH-VOLUME CLEANING OF LIQUIDS AND COMPOSITE ADSORPTION/FILTRATION NANOMATERIAL

(71) Applicant: ART CARBON S. R. O., Nehvizdy (CZ)

(72) Inventors: Daniel Bousa, Celakovice (CZ); Martin Bousa, Kersko (CZ); Kristyna Bousova, Hostivice (CZ)

(73) Assignee: ART CARBON S.R.O., Nehvizdy (CZ)

( * ) Notice: Subject to any disclaimer, the term of this patent is extended or adjusted under 35 U.S.C. 154(b) by 631 days.

(21) Appl. No.: 18/260,422

(22) PCT Filed: Jan. 11, 2022

(86) PCT No.: PCT/CZ2022/000001
§ 371 (c)(1),
(2) Date: Jul. 5, 2023

(87) PCT Pub. No.: WO2022/152338
PCT Pub. Date: Jul. 21, 2022

(65) Prior Publication Data
US 2024/0050923 A1 Feb. 15, 2024

(30) Foreign Application Priority Data
Jan. 12, 2021 (CZ) .................................. CZ2021-09

(51) Int. Cl.
*B01J 20/20* (2006.01)
*B01D 39/20* (2006.01)
(Continued)

(52) U.S. Cl.
CPC ........ *B01J 20/205* (2013.01); *B01D 39/2065* (2013.01); *B01J 20/0229* (2013.01);
(Continued)

(58) Field of Classification Search
CPC ............ B01D 39/1607; B01D 39/1615; B01D 39/1623; B01D 39/2055; B01D 39/2065;
(Continued)

(56) References Cited

U.S. PATENT DOCUMENTS

2015/0122735 A1 5/2015 Yang et al.

FOREIGN PATENT DOCUMENTS

CN 102634870 A * 8/2012
EP 2949624 A1 12/2015
(Continued)

OTHER PUBLICATIONS

WIPO machine translation of CN102634870. (Year: 2012).*
(Continued)

*Primary Examiner* — Brian A McCaig
(74) *Attorney, Agent, or Firm* — Hovey Williams LLP; Paul J. Walker

(57) ABSTRACT

A method of manufacturing a carbon nanotubes-based adsorption/filtration nanomaterial for high-volume cleaning of fluids, which are annealed without access to ambient air at a temperature of 300 to 1150° C. for 0.1 to 12 hours, is described, said carbon nanotubes being subsequently immobilized on a support. substrate based on fibrous natural or synthetic material. Preferably, an inert coarse-grained inorganic and/or organic material is mixed with the immobilized carbon tubes to form a composite adsorption/filtration nanomaterial as a homogeneous mixture.

9 Claims, 2 Drawing Sheets

An optical image of an adsorption/filtration nanomaterial according to the present invention.

(51) Int. Cl.

| | |
|---|---|
| ***B01J 20/02*** | (2006.01) |
| ***B01J 20/28*** | (2006.01) |
| ***B01J 20/30*** | (2006.01) |
| *B82Y 30/00* | (2011.01) |
| *B82Y 40/00* | (2011.01) |

(52) U.S. Cl.
CPC ... *B01J 20/28028* (2013.01); *B01J 20/28042* (2013.01); *B01J 20/3078* (2013.01); *B82Y 30/00* (2013.01); *B82Y 40/00* (2013.01)

(58) Field of Classification Search
CPC ... B01D 39/2068; B01J 20/02; B01J 20/0229; B01J 20/043; B01J 20/10; B01J 20/205; B01J 20/24; B01J 20/261; B01J 20/28028; B01J 20/28042; B01J 20/3078; B01J 20/3204; B01J 20/3208; B01J 20/321; B01J 20/324; C01B 32/158; C01B 32/168; C02F 1/281; C02F 1/283
See application file for complete search history.

(56) References Cited

FOREIGN PATENT DOCUMENTS

| | | | |
|---|---|---|---|
| RU | 2159743 | C1 | 11/2000 |
| WO | 20090101985 | A1 | 8/2009 |
| WO | 2010126686 | A2 | 11/2010 |

OTHER PUBLICATIONS

International Search Report and Written Opinion dated Apr. 25, 2022 for related PCT Patent Application No. PCT/CZ2022/000001 which was filed on Jan. 11, 2022; 13 pages.

Anderson, Robin E. et al., "Multifunctional Single-Walled Carbon Nanotube-cellulose Composite Paper", Journal of Materials Chamistry, vol. 20, No. 12, Jan. 1, 2010, p. 2400.

Binoy, Sarkar et al., "Designer Carbon Nanotubes for Containmnet Removal in Water and Wastewater: A Critical Revice", Science of the Total Environmnet, vol. 612, Sep. 1, 2007, pp. 561-581.

* cited by examiner

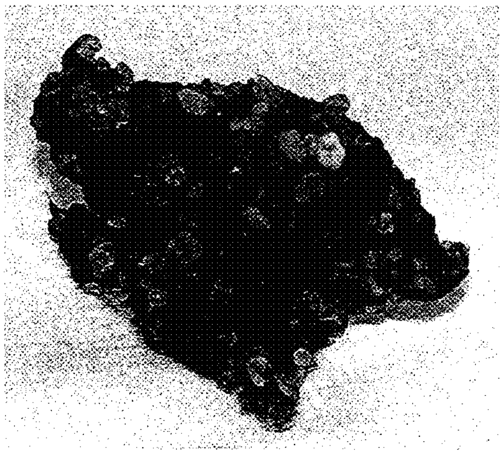
Figure. 1 An optical image of an adsorption/filtration nanomaterial according to the present invention.

Adsorption isotherms

Adsorption isotherms – linearized form

METHOD OF PRODUCTION OF ADSORPTION/FILTRATION NANOMATERIAL FOR HIGH-VOLUME CLEANING OF LIQUIDS AND COMPOSITE ADSORPTION/FILTRATION NANOMATERIAL

RELATED APPLICATIONS

This application is the National Stage of International Patent Application No. PCT/CZ2022/000001, filed Jan. 11, 2022, which is hereby incorporated herein by reference in its entirety, and which claims priority to Czech Patent Application No. PV 2021-9, filed Jan. 12, 2021, which is also incorporated herein by reference in its entirety.

TECHNICAL FIELD

The present invention relates to a nanomaterial for the mass treatment of drinking water, utility water, wastewater, organic liquids such as biofuels, petroleum products, alcohol and distillates and polluted air and other fluids using immobilized carbon nanotubes (CNTs), which are characterized by containing chemically unmodified surface, their lattice distortions are removed, no binder or adhesive is used for immobilization, and preferably they also contain the original catalytic particle based on iron or another metal. It is not necessary to form such a material into a membrane, it can be used with great advantage as a stationary large-volume adsorption bed.

BACKGROUND ART

There are many processes and materials for purifying liquids and gases that have already been patented or described in the literature and that involve the use of CNTs. This is because nanoparticles, which include CNTs, due to their unique properties, are a great promise for finding new technologies and materials that will improve industrial processes.

Although more than 30 years have passed since the discovery of the CNTs, their mass, industrial use in separation technologies, especially in the purification of water, organic liquids, and gases, including air, has still not occurred. This is because CNTs are difficult to immobilize so as not to contaminate the purified fluid (liquid or gas). Many inventors have tried to address this CNTs deficiency.

In patent application US 20150114819 A1, the problem of CNTs leakage into the environment is solved by introducing contaminated liquid into a pressure reactor and at high temperatures and pressures the CNTs are oxidized to carbon dioxide. The disadvantage of this solution is the large additional investment costs for removing CNTs contamination and high energy consumption, which makes this application uncompetitive in terms of mass deployment, e.g. for drinking or wastewater treatment, where hundreds of cubic meters of water are processed per hour.

The solution in patent application US 20150041394 A1 uses a mixture of CNTs with synthetic clays, which are known for their adsorption properties. The addition of CNTs only improves the adsorption activity of the clays, but the clays do not ensure the immobilization of the CNTs. In addition, clays are known for their slow adsorption rate when used as stationary adsorption beds and are therefore used for adsorption in suspension with purified liquid followed by separatory sedimentation where separation of cytotoxic CNTs from clarified liquid is not guaranteed. Thus, this solution improves the adsorption properties of synthetic clay, but does not solve the risk of contamination of the purified liquid with cytotoxic CNTs: the process removes the original contaminants but introduces others into the purified liquid.

Another document, US 20150122735 A1, fixes the CNTs on a cellulose ester membrane so that the CNTs are optimally perpendicular to the membrane surface and parallel to each other. This process of membrane production has not yet been mastered industrially, and the authors themselves state that their invention is applicable only to the purification of small water sources such as tap water. The disadvantage of the present invention is thus the impossibility of mass deployment.

US 20160251244 A1 describes the use of CNTs in the form of a membrane, where CNTs are doped preferably with catalytic metals such as platinum to ensure chemical or electrochemical oxidation (ozone, $O_3$) of micropollutants in drinking water. Although the present invention is defined as innovative over existing oxidation technologies used in water treatment, its use is characterized by high production costs and high qualification requirements for operating personnel. In addition, it does not address the adsorption of oxidation products (polar organic substances such as aldehydes, ketones, carboxylic acids, which subsequently support the resumption of microbial growth in the drinking water distribution network, which are also a potential health risk.

U.S. Pat. No. 7,211,320 B1 claims a composite material in which CNTs are immobilized on an organic or ceramic substrate in the form of a membrane and at the same time CNTs modified by impregnation, functionalization, doping, charging, surface coating or irradiation are used. Such a process represents a high membrane production cost, and in addition the membrane form limits the amount of CNTs used in a given application, so large scale applications require large amounts of expensive membranes, which implies large scale equipment and induces high investment costs. In addition, the adsorption capacity of these membranes is limited by low CNTs content.

For example, Lalia, B. S., Ahmed, F. E., Shah, T., Hilal, N., & Hashaikeh, R. (2015). *Electrically conductive membranes based on carbon nanostructures for self-cleaning of biofouling. Desalination,* 360, 8-12, describes the preparation of a CNT-based membrane, where CNTs are deposited on a PVDF membrane, which is then melted so that the CNTs are fixed to its surface and subsequently such a composite membrane is subjected to periodic electrolysis to increase membrane permeability. Anyone skilled in the art will appreciate that this is a complex and expensive process producing a membrane with a small amount of CNTs and therefore a low adsorption capacity.

Another example is patent KR 101490362 B1, where CNTs are injected together with the coagulant into a stream of purified water with subsequent separation of CNTs on a centrifuge. This process introduces additional chemicals into the treated water, it is costly from the point of view of accuracy control and requires costly machines (centrifuge). In addition, it is also energy intensive.

Russian patent RU 2159743 C1 uses a foam of undefined polymeric material to fix CNTs. Not all polymeric materials can be used to treat e.g. drinking water, and in addition they are a potential environmental burden when disposing of the filter. The material according to the invention, on the other hand, is based on completely recyclable materials.

US 2015166365 A1 indicates the advantage of CNTs impregnated with Fe nanoparticles for removing benzene from water. The material of the present invention preferably utilizes the original iron catalyst particles to achieve increased adsorption capacity to remove organic non-polar contaminants from the water, thereby eliminating any CNTs pre-treatment prior to further use.

Another document US 2015321168 A1 describes the immobilization of CNTs by co-precipitation of metal powders in an aqueous suspension of CNTs, where the CNTs are bound to precipitated metal particles in the form of horse tails, thus forming a composite material which can be removed from liquids for example by magnetic separation. The high cost of this process can be well imagined, as well as the toxicological risks arising from the contact of purified water with powdered metals. In addition, part of the CNT is bound to the precipitated particles and thus not completely accessible for pollutant adsorption.

Japanese patent application filed with EPO as EP 2949624 A1 describes the production of a dispersion of CNTs with cellulose nanofibers up to a diameter of 1000 nm and joined by a latex dispersant containing aldehyde and carboxyl groups. Such a dispersion cannot be used to filter water or other liquids and gases.

Another document WO 2010126686 A2 deals with the production of SWCNT on a MWCNT substrate and declares the suitability of such a material for water filtration. It is obvious that such a material will be extremely expensive and unusable without dispersion on a suitable carrier material.

The disadvantages of all the above-mentioned patent documents are either the need to modify the CNTs used in various ways or the need to immobilize them in the form of a membrane (there are hundreds of patents describing CNT-containing membranes and it is not possible to cite them all) or need to use CNTs in the fluidized state, where the removal of cytostatic CNTs from the produced fluids is not ensured. Most of the cited patents or articles are practically unusable, due to their high production costs of the given material, considerable requirements for additional investments and the need for qualified staff.

The described solutions using CNTs in membranes have the disadvantage that the amount of CNTs used in a given material is very small, and therefore the membrane materials described above are not able to process large amounts of fluids due to the low adsorption capacity. This is also the reason why none of the solutions described above has yet found room for mass commercial use. This fact is well documented in US document 2005263456 A1 by Seldon Technologies, which describes the installation of a CNT membrane or sieve from U.S. Pat. No. 7,211,320 B1 and thus demonstrates the impossibility of mass deployment of this solution. The production of the membrane is then described by Seldon in US 2017252704 A1.

SUMMARY OF THE INVENTION

The prior art does not allow the use of CNTs for mass treatment of waste and drinking water, liquids and gases, including air. The present invention relates to the immobilization of unmodified CNTs in a high volume composite material which can be used on existing adsorption devices, e.g. pressure sand filters, and which is comparable in price to existing adsorption media, e.g. activated carbon, without suffering from microbial overgrowth (as activated carbon does), removes broad spectrum of micropollutants such as herbicides and other agrochemicals, drugs, by products of drinking water chlorination and at the same time ensures microbial and virotic safety of the produced fluid (water, organic liquids, gas, air). Due to the low production costs and the ability of the material to be used on existing, already installed adsorption technologies, the presented adsorption/filtration nanomaterial has great potential for mass use in the production of safe water, air sterilization in air distribution systems (e.g. *Legionella* problem—*Legionella pneumophila*—in hospital air distribution systems). As the shortage of safe drinking water increases globally, the material has great commercial potential in the field of water management compared to CNT membrane processes.

The adsorption kinetics of organic pollutants onto the material according to the invention is at least 10 times faster with respect to organic pollutants than, for example, onto granular activated carbon (GAC). For example, a drinking water treatment plant for a medium-sized city processes 1 to 3 m 3 of water per second at a linear flow of 7 m/h, which represents an amount of 1000 to 3000 m 3 of GAC adsorbent material per installation. Due to the higher adsorption kinetics of the nanomaterial according to the invention, the required amount of adsorption/filtration material in such a water treatment plant is reduced to 20 to 60 $m^3$, which significantly reduces the investment and operating costs for producing quality drinking water.

The present invention solves the above-mentioned problems related to the purification of liquids and gases based on the immobilization of carbon nanotubes in a large-volume bed. One aspect of the present invention relates to a method of purifying fluids by passing a contaminated fluid through a bed of the present nanomaterial, wherein the nanomaterial is represented by CNTs without lattice distortions treated with high temperature annealing without air and where CNTs are immobilized on natural or synthetic fibres to form bulk material, and when at least one pollutant present in the fluid is separated, decomposed or destroyed. The term "Nanomaterial" refers to a structure whose at least one dimension is in the order of one billionth of a meter.

Non-lattice distortion carbon nanotubes are those that do not contain a crystalline disorder or chemical interaction that would result in a change of $sp^2$ hybridization between individual carbon bonds.

Another aspect of the invention relates to carbon nanotubes whose surface is free of amorphous carbon, graphene, fullerene and their degradation products, which are by-products of carbon crystallization in the industrial production of CNTs. In the present invention, where the CNTs are free of these surface impurities, the CNTs have a significantly higher adsorption capacity than the CNTs containing these degradation products or CNTs that are surface modified with chemical processes described in the literature that allow the nanotubes to react with other chemicals, decreasing its adsorption capacity.

Another aspect of the invention relates to the immobilization of heat-treated CNTs without lattice distortions and chemical modification with intact sp 2 hybridization on a support substrate, preferably natural or synthetic fibres, preferably cellulose fibres, not forming membrane structure, which can be layered into arbitrarily thick layers ranging from 0.1 mm up to layers reaching several meters. The fibres may be cellulose fibres, synthetic fibres, glass fibres, wool fibres or cotton fibres, the diameter of the fibres being from 0.1 to 500 μm, preferably from 1 μm to 50 μm, and their length being 0.1 mm to 1000 mm, preferably from 3 mm to 10 mm.

Preferably, the adsorption/filtration nanomaterial is in the form of a stationary large-volume three-dimensional adsorption bed with a diameter of 0.03 to 10 m and a packing height of 0.03 to 5 m. For example, the material in question is filled into a standard pressure adsorption vessel with a volume of 1 $m^3$, where the diameter of the vessel is 2 m and the height of the layer of adsorbent material is 0.8 m, i.e. it is not a membrane.

Another aspect of the present invention relates to the fact that the CNTs contain the original catalytic metal particle that served as crystallization seed during their manufacture. CNTs are produced by the CVD (chemical vapor deposition) method, where methane or other organic gas is catalytically decomposed at high temperatures and without access to air, and the released carbon crystallizes on catalytic metal seed particles in the form of nanotubes. The catalyst particle is typically iron, Fe, or another transition metal. The presence of a metal particle causes charge induction along the CNT and thus polarizes the individual ends of the nanotube, which is advantageous for the adsorption of polar organic contaminants such as trihalomethanes (THMs), which are secondary products of drinking water disinfection with chlorine and have been shown to be carcinogenic.

The physical state of the CNTs described in this invention is the cause of the broad-spectrum adsorption capacity of the final material, i.e. the final material is able to remove a wide range of different contaminants such as pesticides, herbicides, fungicides, active drug ingredients, chlorinated hydrocarbons but also bacteria and viruses without the need to be modified or doped with various chemicals or non-metallic ions bound to the CNTs surface as disclosed in U.S. Pat. No. 7,211,320 B1.

Another aspect of the invention is a composition of immobilized CNTs on natural or synthetic fibres with a coarse-grained inert inorganic and/or organic material such as glass, silica sand, alumina, granular activated carbon, crushed coconut shells, synthetic stone, wherein the grain size ranges from 0.01 to 5 mm, preferably from 0.1 to 1.6 mm, where this coarse-grained inert inorganic and/or organic material further disintegrates the immobilized CNTs on the support substrate and thus reduces the pressure drop of the material as fluids pass. The weight ratio between the immobilized carbon nanotubes on the substrate to the inert coarse-grained inorganic and/or organic material is in the range of 1:15 to 1:0.001, preferably 1:5 to 1:1. This is important for the use of material in mass cleaning fluids applications, where volumes in the order of hundreds of cubic meters per hour are processed.

The described method thus produces a composite material composed of CNTs without lattice distortion and chemical modification of their surface, natural or synthetic fibres and ceramic inert inorganic and/or organic material mentioned above, which allows CNTs to be used for removal of wide range of contaminants in a contact layer several meters thick, without impeding fluid flow.

Due to the cytostatic properties of CNTs, the so-called "biofouling" does not occur in the given large-volume layer, i.e. the formation and multiplication of various microorganisms, which eventually contaminate the purified fluid with their metabolites and block the effectiveness of other adsorption media, such as activated carbon by blocking its active surface.

Carbon nanotubes from industrial production are coated with amorphous carbon, graphene, fullerenes and other carbon crystallization by-products. These by-products are removed by annealing the CNTs in a controlled atmosphere at temperatures of 300 to 1150° C. for a selected time of 0.1 to 12 hours. The resulting CNTs thus have a surface free of these impurities, which is formed only by crystalline carbon hexagons, which are part of the basic crystal lattice of the CNTs.

During annealing in a controlled atmosphere, partially oxidized carbon contaminants are formed, which evaporate from the CNTs surface and create a suitable atmosphere to heal the lattice distortions of the basic CNTs crystal lattice.

CNTs treated in this way, without lattice distortion and chemically modified surface, have a significantly higher adsorption capacity than untreated or chemically modified CNTs. Although a large volume adsorption/filtration material can also be prepared from untreated CNTs, such material exhibits a lower adsorption capacity, as demonstrated in Example 2 below. During the chemical modification of CNTs described in the various patents cited in the "State of the art" section, the CNTs are freed of the original catalytic metal particles. Such CNTs are not polarized and are less effective in trapping polar organic substances. During CNTs annealing in a controlled atmosphere, these catalytic particles remain an integral part of the CNTs and thus improve the adsorption activity of the CNTs and their broad-spectrum effect.

Due to their small dimensions, carbon nanotubes can penetrate various filtration materials, and therefore it is necessary to fix them on a supporting substrate. Previously known methods of CNTs immobilization consist in fixing the CNTs to the body or surface of the membrane, which determines the final shape of the material and limits the method of implementation. The annealed carbon nanotubes described in this invention are immobilized on fibrous natural or synthetic fibres, preferably cellulosic fibres. This method of immobilization does not require subsequent production of the membrane, thus allows the use of the subject material as a large-volume adsorption medium.

The preferred procedure for immobilization is to pulp the natural or synthetic material, for example in water or an organic solvent, where a suspension of natural or synthetic fibres is formed. Annealed CNTs are then mixed into this suspension, which firmly adhere to the surface of the fibres, thus immobilizing them. As soon as the suspension stops stirring, a layer of clear liquid free of CNTs immediately begins to separate above the suspension.

However, the mixture of CNTs and natural/synthetic fibres is characterized by reduced permeability (higher resistance to fluid flow) in thick layers. This disadvantage is eliminated by mixing a selected amount of inert coarse-grained inorganic and/or organic material into the suspension of CNTs and natural or synthetic fibres, which is freed of excess liquid, thus loosens the structure of the material and increases its permeability. This produces a composite adsorption/filtration nanomaterial with immobilized CNTs in the form of a homogeneous mixture that can be used as a high-volume adsorption or filtration medium. The weight ratio between the immobilized carbon nanotubes on the substrate to the inert coarse-grained inorganic and/or organic material is in the range of 1:15 to 1:0.001, preferably 1:5 to 1:1.

BRIEF DESCRIPTION OF DRAWINGS

FIG. 1 shows an optical image of an adsorption/filtration nanomaterial according to the present invention.

EXAMPLES

Figure 2A:
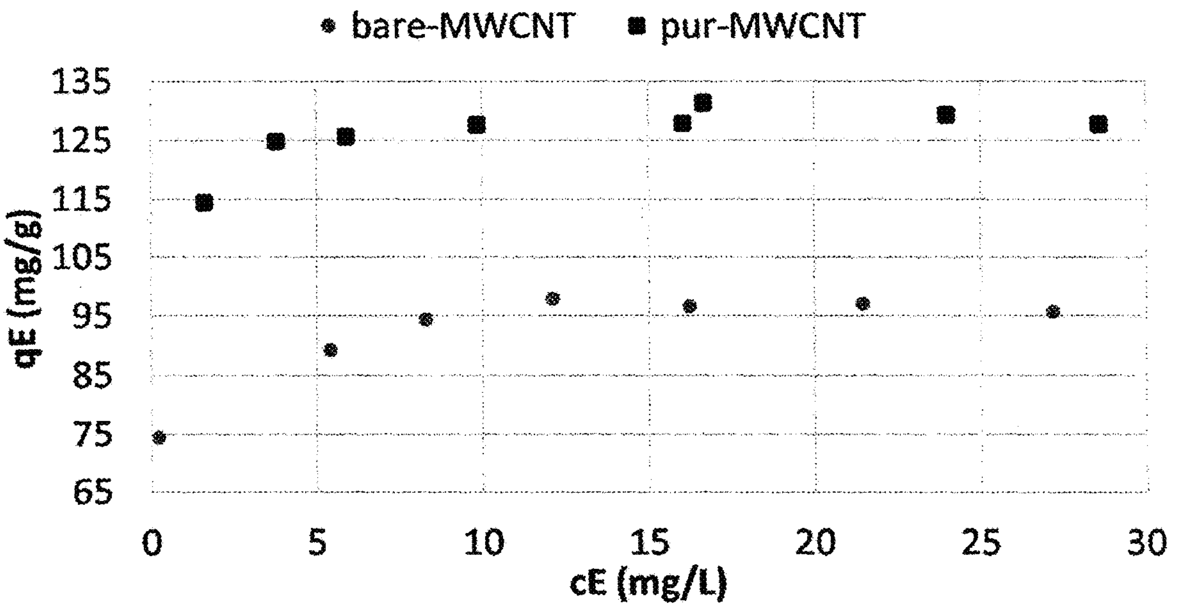
FIG. 2A shows a comparison of adsorption isotherms of untreated CNTs (bare) and annealed CNTs (pur).

Example 1 a) The adsorption/filtration nanomaterial of the present invention was prepared from commercially available carbon nanotubes (CNTs). An amount of 16 g of CNTs was weighed into a glass vessel and diluted to a volume of 2 l with water and dispersed by ultrasound. In the next step, the CNTs were separated from the aqueous suspension by vacuum filtration, spread on a glass tray and dried at 50° C. After drying, the CNTs were ground to a fine powder which was layered in a thin layer on a glass tray and the CNTs were thus annealed in a closed oven without fresh air at 630° C. for 2 hours, with the weight ratio of oxygen in the air to the weight of the CNTs being treated was 1:16. Under these conditions, the oxygen present in the furnace chamber is consumed, which upon reaction with amorphous carbon, graphene, fullerenes and other carbon crystallization by-products creates a non-oxidizing atmosphere preventing the combustion of additional carbon.

In another embodiment of this example, the annealing was performed at 320° C. for 5 h in oven without access to fresh air as described in the paragraph above. Furthermore, for example, at a temperature of 1050° C. for 1 hour. In all the above examples, purified CNTs free of amorphous carbon, graphene, fullerenes and other carbon crystallization by-products were prepared. The annealed CNTs were weighed into a glass vessel and mixed together with 2 l of water. The CNTs were then disintegrated/dispersed using a Fisherband 11201a ultrasonic homogenizer for 15 min (20-80 kHz, 20-100% A).

16 g of pulp were weighed into a glass vessel and suffused with 5 l of water. Using conventional mixers, the pulp was mixed for 1 minute to form a suspension of cellulose fibres in water.

The above-described suspension of disintegrated/dispersed CNTs in water was added to the cellulose fibre suspension. The mixture was then homogenized using a mixer for 2 min. During this step, the CNTs are fixed on the surface of the cellulose fibres. The aqueous CNT-cellulose suspension is then freed of excess water. The CNT-cellulose suspension is poured onto a stainless-steel screen lined with a nonwoven filtration cloth and left there until excess water drains from it. The wet CNT-cellulose mixture was transferred to a stainless-steel mixer for further processing.

438 g of an inert coarse-grained inorganic and/or organic material, in particular silica sand with a grain size of 0.1-0.5 mm, were added to a stainless-steel mixer with a CNT-cellulose mixture. The mixture was homogenized for 5 minutes using a mixer. By mixing with an inert coarse-grained inorganic and/or organic material, a large-volume adsorption/filtration composite nanomaterial is formed in the form of a homogeneous mixture. The weight ratio of the immobilized nanotube on the support substrate to the inert inorganic and/or organic material is in this case 1:13.6.

The adsorption/filter material prepared as described above could then be filled into adsorption vessels of various types and constructions so as to produce a large-volume adsorption apparatus with a layer height of 30 cm and a diameter of 5 cm. The placement of the adsorbent bed in the adsorption apparatus and the flow of water through the adsorbent bed is arranged so that the purified water flows through the entire height of the adsorption/filtration nanomaterial. It is therefore a large-volume adsorption device that does not use membranes and contains CNTs as the active material.

b) In another embodiment of this example, the CNTs annealed as described in the second paragraph of this example were disintegrated/dispersed using a Fisherband 11201 ultrasonic homogenizer for 15 min (20-80 kHz, 20-100% A).

Subsequently, 16 g of polypropylene fibres were weighed into a glass vessel and suffused with 5 l of water. Using commonly available mixers, the fibres were pulped for 1 minute to form a suspension of polypropylene fibres in water. Polypropylene fibres had a diameter of 30 microns and a length of 25 mm.

The above-described suspension of disintegrated/dispersed CNTs in water was added to the polypropylene fibre suspension. The mixture was then homogenized using a mixer for 2 min. During this step, the CNTs are fixed on the surface of the polypropylene fibres. The aqueous CNT-polypropylene fibres suspension is then freed of excess water. The CNT-polypropylene fibres suspension is poured onto a stainless-steel sieve lined with a nonwoven filtration cloth and left there until excess water drains from it. The wet CNT-polypropylene fibres mixture material was transferred to a stainless-steel mixer for further processing.

438 g of an inert coarse-grained inorganic and/or organic material, in this embodiment of Example 1, specifically crushed limestone with a grain size of 1-3 mm, were added to a stainless-steel mixer with a CNT-polypropylene fibres. The mixture was homogenized for 5 minutes using a mixer. Mixing with crushed limestone produces a large-volume adsorption/filtration nanomaterial.

c) In another embodiment of this example, 16 g of disintegrated/dispersed CNTs were mixed with 16 g of fibrous cellulose, and material permeability tests were performed in comparison with the material according to paragraph b). The results showed that the permeability of such a material was on average 23% lower than that of a composite material containing an inert coarse-grained inorganic and/or organic material.

Example 2

Figure 2B:
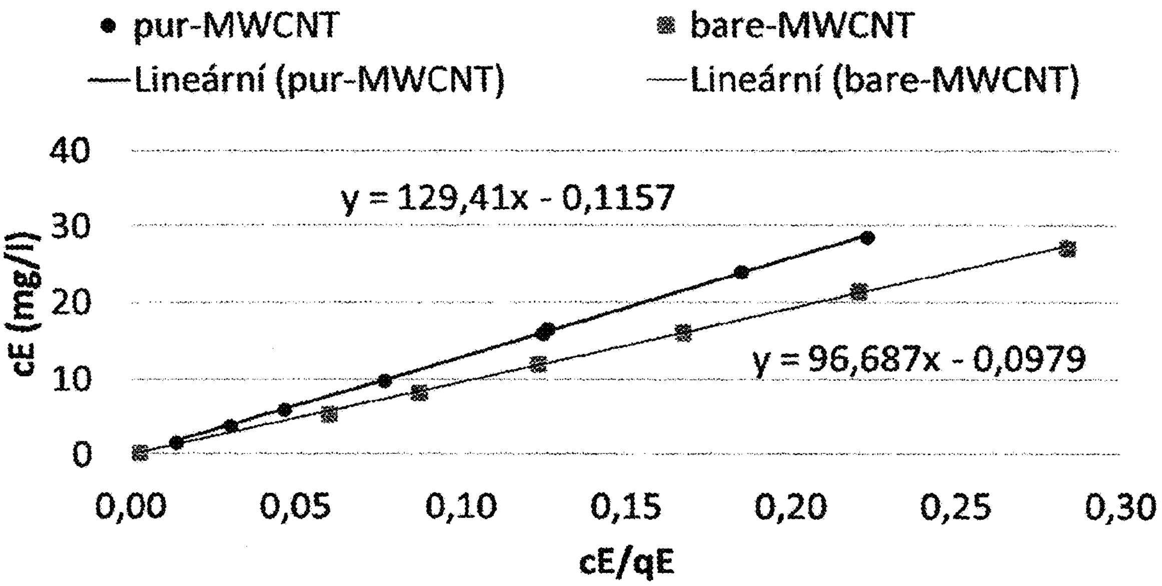
FIG. 2B shows linearized forms of adsorption isotherms of untreated CNTs (bare) and annealed CNTs (pur).

The adsorption/filtration nanomaterial prepared according to Example 1, except that synthetic fibers were used to fix the CNTs and the CNTs used were not annealed. The adsorption capacity of the nanomaterial with unannealed CNTs was 25% lower, measured on a methylene blue standard, as documented in FIG. 2.

Example 3

The adsorption rate (adsorption kinetics) of the nanomaterial prepared according to Example 1 is approximately 10 times higher than that of GAC. This fact is described in this example.

One 3.5 cm diameter glass column with a barren bottom was packed with the adsorbent of the present invention, and second column with the GAC. The height of the adsorbent in both columns was 8 cm. A cane molasses solution with a concentration of 1 wt. % (corresponding to a BRIX value of 1°) was used as model water contaminated with organic substances. The molasses solution flowed gravitationally through the layer of both adsorbents, with the linear flow rate of the molasses solution being similar in both cases. The resulting contact times of the molasses solution with the adsorbent (residence time) were 10 s for the adsorbent material according to the invention and 12 s for GAC.

Despite the comparable contact time of the molasses solution with the adsorbent, the adsorbent according to the invention completely removed the molasses from the solution (BRIX 0°), while for the GAC adsorbent the decrease in molasses concentration in the solution was minimal (BRIX 0.98°). Thus, this example clearly demonstrates the fact that a substantially shorter residence time (10 s for molasses as a pollutant) is sufficient to remove certain organic substances from water with the adsorbent of the present invention in comparison to GAC, which in practice normally requires a residence time of 10 minutes or more.

Example 4

This example describes the use of an adsorption/filtration nanomaterial prepared according to Example 1 for the removal of drug residues and antibiotics from already treated wastewater at the outlet of a central wastewater treatment plant (WWTP).

The collected wastewater (already treated by technology used in wastewater treatment plants, referred to herein as V_COV) was subjected to analysis, which monitored the content of 50 different drugs and antibiotics. The analysis revealed the presence of 37 of the 50 monitored substances. The concentrations of these substances are summarized in Table 1.

TABLE 1

Summary of the content of drugs and antibiotics in the wastewater and after adsorption on the material according to the invention.

| Compound name | V_COV (ug/L) | T_COV_10 (ug/L) | T_COV_20 (ug/L) |
|---|---|---|---|
| 10,11-Dihydro-10-hydroxy Carbamazepine | 0.010 | 0 | 0 |
| 10,11-Dihydroxycarbamazepine | 0.600 | 0 | 0 |
| 2-Hydroxy Carbamazepine | 0.040 | 0 | 0 |
| 4-Hydroxy Diclofenac | 0.430 | 0 | 0 |
| Atenolol | 0.060 | 0 | 0 |
| Azithromycin | 0.230 | 0 | 0 |
| Bezafibrate | 0.010 | 0 | 0 |
| Caffeine | 0.200 | 0 | 0 |
| Carbamazepin | 0.490 | 0 | 0 |
| Carbamazepine 10,11-Epoxide | 0.570 | 0 | 0 |
| Carboxyibuprofen | 0 | 0 | 0 |
| Chloramphenicol | 0 | 0 | 0 |
| Ciprofloxacin | 0 | 0 | 0 |
| Clarithromycin | 0.250 | 0 | 0 |
| Diclofenac | 1.270 | 0 | 0 |
| Diltiazem | 0.040 | 0 | 0 |
| Erythromycin | 0.070 | 0 | 0 |
| Fluoxetine | 0.050 | 0 | 0 |
| Furosemide | 1.130 | 0 | 0 |
| Gabapentin | 1.710 | 1.508 | 1.236 |
| Gemfibrozil | 0.040 | 0 | 0 |
| Hydrochlorothiazide | 0.790 | 0 | 0 |
| Iohexol | 0 | 0 | 0 |
| Iopamidol | 0.030 | 0 | 0 |
| Iopromide | 0 | 0 | 0 |
| Ketoprofen | 0.120 | 0 | 0 |
| Lincomycin | 0.030 | 0 | 0 |
| Metoprolol | 1.850 | 0 | 0 |
| Naproxen | 0.350 | 0 | 0 |
| Nifedipine | 0 | 0 | 0 |
| O-Desmethylnaproxen | 0.190 | 0 | 0 |
| Oxcarbazepine | 0.150 | 0 | 0 |
| Paracetamol | 0 | 0 | 0 |
| Paraxanthine | 0.100 | 0 | 0 |
| Penicillin G | 0 | 0 | 0 |
| Ranitidine | 0.650 | 0 | 0 |
| Roxithromycin | 0.080 | 0 | 0 |
| Saccharin | 0.120 | 0 | 0.082 |
| Sertraline | 0.080 | 0 | 0 |
| Sulfamerazine | 0 | 0 | 0 |
| Sulfamethazine | 0 | 0 | 0 |
| Sulfamethoxazol | 0.390 | 0 | 0.250 |
| Sulfanilamide | 0 | 0 | 0 |
| Sulfapyridine | 0.300 | 0 | 0 |
| Tramadol | 0.660 | 0 | 0 |
| Triclocarban | 0 | 0 | 0 |
| Triclosan | 0 | 0 | 0 |
| Trimethoprim | 0.130 | 0 | 0 |
| Venlafaxine | 0.430 | 0 | 0 |
| Warfarin | 0.030 | 0 | 0 |

The adsorption/filtration nanomaterial was filled into a laboratory adsorption column. The adsorption column was provided with a barren bottom in the lower part, on which an adsorption/filter material with a height of 30 mm was subsequently layered. The column was connected at the bottom to a vacuum pump, which was the driving force behind the filtration.

The wastewater V_COV was filtered through an adsorption column prepared as described above. For the analysis of drugs and antibiotics content, a sample of filtered water after 10 and 20 litres of filtered wastewater was taken. These samples were marked as T_COV_10 and T_COV_20. After filtering the wastewater through the adsorption/filtration nanomaterial, only 3 of the originally 37 substances present were found. The concentration of these three substances, which were not fully captured during filtration, decreased. The adsorption/filtration nanomaterial behaved as broad-spectrum adsorption material in real wastewater, i.e. it captured a wide range of chemically different substances and it was arranged in the form of a large-volume bed, whose height was 4 times greater than its width.

Example 5

This example describes the ability of an adsorption/filtration nanomaterial prepared according to Example 1 to remove four selected pesticides from model water (most common in groundwater and surface water in the Czech Republic).

The model solution was prepared from the following analytical grade pesticides: chloridazon, alachlor, metazachlor, metolachlor. The concentration of individual pesticides in the model solution was 150 mg/l, which corresponds to a total concentration of 600 mg/l. Of course, such high concentrations will not occur in real waters and were thus chosen only for the purpose of determining the adsorption capacity of the adsorbent. The adsorption bed was arranged as in Example 3. The model solution contained four pesticides at the same time, in order to approximate the real conditions. In real waters, several different substances will always be adsorbed simultaneously.

Indicative adsorption isotherms for individual pesticides present in the solution were measured on the model solution. The percentage decrease in the concentration of individual pesticides was calculated from them, as shown in Table 2. From the measured data it is evident that even with such high concentrations of pesticides in model waters, adsorption/filtration nanomaterial can remove 35 to 70% of micropollutants present.

In real waters, where the total concentration of micropollutants is significantly lower (units to low tens of μg/l), the percentage capture will be significantly higher, similar to the drug capture described in Example 4.

TABLE 2

Percentage decrease of pesticide concentration in the model solution after adsorption on the material according to the invention. The average decrease based on four experiments performed at different pesticide concentrations is shown in bold.

| Chloridazon | Alachlor | Metazachlor | Metolachlor |
|---|---|---|---|
| 67.87% | 50.34% | 26.45% | 56.61% |
| 73.03% | 29.68% | 40.69% | 61.04% |
| 68.35% | 33.85% | 36.67% | 49.43% |
| 67.10% | 44.63% | 41.84% | 58.09% |
| 69.09% | 39.62% | 36.41% | 56.29% |

Example 6

This example describes the ability of an adsorption/filtration nanomaterial prepared according to Example 1 to remove four selected pesticides from model water, the same as in Example 5, except that their initial concentrations are at the level expected in real waters (on the order of low tens μg/l).

The model solution was prepared from the following analytical grade pesticides: chloridazon, alachlor, metazachlor, metolachlor. The concentrations of individual pesticides in the model solution were 1.7-2.6 μg/l, which corresponded to a total concentration of all pesticides of 8.24 mil. These relatively low concentrations can be expected in real waters and this example is therefore complementary to Example 5. The adsorption material was in this case arranged in a stainless-steel pressure filter with a diameter of 22.5 cm, where the height of the adsorption material according to the invention was 26 cm, 15 cm, 10 cm and 5 cm. The residence time, which was 313 s, 147 s, 78 s and 25 s, also depended on the height of the adsorption bed. The results in table 3 show the concentration of pesticides in input water as well as in water which passed through the adsorbent of different height. The results in this table show reduction of pesticide concentration by more than 99% with the exception of one pesticide at a thickness of the adsorption layer of 5 cm. This example further illustrates the rapid adsorption kinetics of pollutants.

TABLE 3

Concentrations of the four selected pesticides in the input water and the water after passing through the filter filled with different heights of the adsorbent according to the invention.

| (μg/l) | Alachlor | Chloridazon | Metazachlor | Metolachlor | Total |
|---|---|---|---|---|---|
| Input water | 1.74 | 2.63 | 1.92 | 1.95 | 8.24 |
| 26 cm | 0.005 | 0.01 | 0.01 | 0.01 | 0.035 |
| Capture, % | 99.7 | 99.6 | 99.5 | 99.5 | 99.6 |
| 15 cm | 0.005 | 0.01 | 0.01 | 0.01 | 0.035 |
| Capture, % | 99.7 | 99.6 | 99.5 | 99.5 | 99.6 |
| 10 cm | 0.005 | 0.01 | 0.01 | 0.01 | 0.035 |
| Capture, % | 99.7 | 99.6 | 99.5 | 99.5 | 99.6 |
| 5 cm | 0.02 | 0.01 | 0.112 | 0.011 | 0.153 |
| Capture, % | 98.9 | 99.6 | 94.2 | 99.4 | 98.1 |

Example 7

This example describes the ability of an adsorption/filtration nanomaterial prepared according to Example 1 to disinfect wastewater at the outlet of a wastewater treatment plant (V_COV) and groundwater from the Elbe region, Kersko (V_KER) (Czech Republic) arranged in the form of a large-volume adsorption bed.

First, the input water samples (V_COV and V_KER) were subjected to microbiological analysis by culturing microorganisms with growth specifications at 22° C. and 36° C. (according to ČSN EN ISO 6222), determination of intestinal enterococci (ČSN EN ISO 7899-2), determination of coliform bacteria in non-disinfected waters (ČSN 75 7837), determination of thermotolerant coliform bacteria and *E. coli* (ČSN 75 7835), determination of *Clostridium perfringens* (Annex No. 6 to Decree No. 252/2004 Coll.). Furthermore, a microscopic analysis was performed in order to determine the presence of biosestone (living organisms) and abiosestone (non-living particles) according to ČSN 75 7712 and ČSN 75 7713 standards.

For the purpose of this experiment, a laboratory adsorption column was packed as described in Example 2. Both water samples were then filtered through this column and samples after 10 and 20 filtered litres were taken for the analyses described above. The results of microbiological, resp. microscopic analysis of disinfected water, are given in Table 4, resp. Table 5.

Microbiological analysis shows the effectiveness of the filter in non-chemical microbial decontamination of water. CNTs have a demonstrable effect on cell wall disruption (National Research Council (US) Safe Drinking Water Committee. Drinking Water and Health: Volume 2. Washington (DC): National Academies Press (US); 1980. IV, An Evaluation of Activated Carbon for Drinking Water Treatment Available from: https://www.ncbi.nlm.nih.gov/books/NBK234593/). Although drinking water was not prepared from highly contaminated and microbially very active water by above described filtration, a significant decrease in the content of microorganisms suggests that a significantly lower amount of chlorine could be used for additional microbial decontamination, the use of which is also problematic in itself (residual chlorine in water and formation of chlorinated hydrocarbons. (Kožíšek F.: Proč voda s chlorem, proč voda bez chloru? Sbomík konference Pitná voda 2010, s. 35-40. W&ET Team, Č. Buděejovice 2010. ISBN 978-80-254-6854-8)

Microscopic analysis shows the effectiveness of the adsorption/filtration nanomaterial to eliminate plant and animal masses from filtered water. Since biosestone and abiosestone are represented by relatively large particles, their complete capture is expected.

The number of cultured bacteria (KOLI, ECOLI, ENTERO, CLO; see Table 4 for explanations) are summarized in Table 4.

TABLE 4

Summary of the results of microbiological analysis of wastewater samples (V_COV), groundwater (V_KER) and corresponding filtered water samples (T_COV_10, T_COV_20 and T_KER).

| | V_COV | T_COV_10 | T_COV_20 | V_KER | T_KER |
|---|---|---|---|---|---|
| CUMI 22° C. [CFU/ml] | 49120 | 10 | 131 | 3720 | 15 |
| CUMI 36° C. [CFU/ml] | 29840 | 3 | 80 | 2580 | 9 |
| COLI [CFU/100 ml] | 57000 | 7 | 89 | 210 | 0 |
| ECOLI [CFU/100 ml] | 27700 | 4 | 16 | 104 | 0 |
| ENTERO [CFU/100 ml] | 10700 | 20 | 11 | 0 | 0 |
| CLO [CFU/100 ml] | 1000 | 0 | 10 | 0 | 0 |

Explanations:

CUMI22° C. . . . culturable microorganisms with growth specification at 22° C.

CUMI36° C. . . . culturable microorganisms with growth specification at 36° C.

COLI . . . coliform bacteria

ECOLI . . . *Escherichia coli*

ENTERO . . . intestinal enterococci

CLO . . . *Clostridium perfringens*

CFU . . . colony forming units

TABLE 5

Summary of the results of microscopic analysis of wastewater samples (V_COV), groundwater (V_KER) and corresponding filtered water samples (T_COV_10, T_COV_20 and T_KER).

| Biosestone/type | V_COV Number [indiv./ml] | T_COV 10 Number [indiv./ml] | T_COV 20 Number [indiv./ml] | V_KER Number [indiv./ml] | T_KER Number [indiv./ml] |
|---|---|---|---|---|---|
| Cyanobacteria | 6 | — | — | — | — |
| Diatoms | 20 | — | — | 4 | — |
| Chlorococcal algae | 12 | — | — | | — |
| Colorless whipworms | 42 | — | — | 4 | — |
| Funnels | 16 | — | — | — | — |
| Purses and covers | 10 | — | — | — | — |
| Total number of biosestone [indiv./ml] | 106 | — | — | 8 | — |
| Abioseston/type | Percentage of coverage [%] | Percentage of coverage [%] | Percentage of coverage [%] | Percentage of coverage [%] | Percentage of coverage [%] |
| Anorg. particles, sand, starch, diatom boxes, rose. fibers, animal residues | 3 | 3 | 2 | 2 | 1 |

Example 8

The last example shows the ability of the adsorption/filtration nanomaterial prepared according to Example 1 to remove water from the viral load, namely the removal of rotaviruses A.

For the purposes of this experiment, wastewater was first taken from the wastewater treatment plant, but this time immediately after the sieves, i.e. water that has not yet undergone the biological sludge treatment process. 8.8 million rotavirus A particles were found in the unfiltered wastewater. No rotavirus A particles were found in the water that passed through the adsorption/filtration nanomaterials. With current knowledge, it can be assumed that virus elimination is caused by the capture of virus particles in the structure of the adsorption/filtration nanomaterial. The measurements were performed in duplicate to verify the accuracy of the measurements and its summary is shown in Table 6.

TABLE 6

Summary of the number of viral particles measured in the wastewater (taken just after the sieves) and in water after adsorption on the material according to the invention.

| Sample | Cp | Number of virotic particles in 1 I of concentrated wastewater/treated water |
|---|---|---|
| Sample nmb.1 (concentrated wastewater) | 29.08 | 1690 |
| Sample nmb.2 (concentrated wastewater) | 29.24 | 1510 |
| Sample nmb.1 (concentrated wastewater after treatment with adsorption/filtration material) | — | Not detected |
| Sample nmb.1 (concentrated wastewater after treatment with adsorption/filtration material) | — | Not detected |
| Negative control | — | Not detected |

The invention claimed is:

1. A process for the production of a carbon nanotube-based adsorption/filtration nanomaterial for cleaning of fluids based on carbon nanotubes, characterized in that the carbon nanotubes are annealed without access to ambient air at a temperature of 300 to 1150° C. for 0.1 to 12 hours to remove amorphous carbon, graphene, fullerenes and other by-products of carbon crystallization, to form carbon nanotubes without lattice distortion or a chemically modified surface, said carbon nanotubes being subsequently immobilized on a support substrate based on fibrous natural or synthetic material.

2. The process for the production of a carbon nanotube-based adsorption/filtration nanomaterial for cleaning of fluids, according to claim 1, characterized in that a pulping of the natural or synthetic material takes place in water or an organic solvent to form a suspension of natural or synthetic fibres.

3. The process for the production of a carbon nanotube-based adsorption/filtration nanomaterial for cleaning of fluids according to claim 1, characterized in that an inert coarse-grained inorganic and/or organic material is added to the immobilized carbon nanotubes in a weight ratio of immobilized carbon nanotubes on substrate to an inert coarse-grained inorganic and/or organic material of 1:15 to 1:0.001 to form a composite homogeneous mixture.

4. An adsorption/filtration nanomaterial in the form of a homogeneous mixture, for liquid cleaning, produced by the process according to claim 3, characterized in that it comprises immobilized carbon nanotubes on a support substrate based on fibrous natural or synthetic material, and further comprises an inert inorganic and/or organic coarse-grained material in a volume weight ratio of immobilized carbon nanotubes on the substrate to an inert coarse-grained inorganic and/or organic material of 1:15 to 1:0.001.

5. The adsorption/filtration nanomaterial according to claim 4, characterized in that the inert coarse-grained material is glass, silica sand, alumina, granular activated carbon, crushed coconut shells, or synthetic stone, whereas having a grain size ranging from 0.01 to 5 mm.

6. An adsorption/filtration nanomaterial for fluid purification, produced by the process according to claim 1, characterized in that it comprises immobilized carbon nanotubes on a support substrate based on fibrous natural or synthetic material, wherein the immobilized carbon nanotubes contain a catalytic metal seed particle from a crystallization of the immobilized carbon nanotubes.

7. The adsorption/filtration nanomaterial according to claim 6, wherein the support substrate is a stationary three-dimensional adsorption bed with a diameter of 0.03 to 10 m and a filling height of 0.03 to 5 m.

8. The adsorption/filtration nanomaterial according to claim 6, characterized in that the catalytic particle is iron or another transition metal of the Periodic Table of the Elements.

9. The adsorption/filtration nanomaterial according to claim 6, characterized in that the fibrous natural or synthetic material comprises fibres, wherein the fibres are cellulose fibres, synthetic fibres, glass fibres, wool fibres or cotton fibres, whereas the fibre diameter being from 0.1 to 500 μm and their length is 0.1 mm to 1000 mm.

* * * * *